T. Rowell,

Shaft Coupling.

No. 101,047. Patented Mar. 22, 1870.

Witnesses
Harry Rogers
S. J. Hibbard

Inventor
Theodore Rowell,
By his Attorney
G. L. Chapin

United States Patent Office.

THEODORE ROWELL, OF BEAVER DAM, WISCONSIN.

Letters Patent No. 101,047, dated March 22, 1870.

IMPROVEMENT IN SHAFT-COUPLING.

The Schedule referred to in these Letters Patent and making part of the same.

*To all whom it may concern:*

Be it known that I, THEODORE ROWELL, of Beaver Dam, in the county of Dodge, and State of Wisconsin, have invented an Improved Shaft-Coupling; and I do hereby declare that the following is a full, clear and exact description thereof, which will enable those skilled in the art to make and use the same, reference being had to the accompanying drawings and letters marked thereon making a part of this specification, in which—

Figure 3:
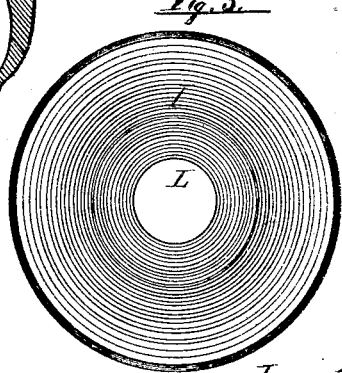

Figure 3, an elevation of the protector.

Figure 4:
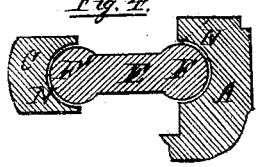

Figure 4, a section of one of the double ball-and-socket joints.

The object of the present invention is to provide a simple, cheap and durable coupling for connecting shafts which run out of line; and Its nature consists of a center sleeve and an outer frame or case, both of which support sockets for forming, in combination with braces, compound ball-and-socket joints, which allow a shaft put through the collar to have a free oscillating motion while the coupling is rotating; and further, in combining with the case of the coupling an elastic cap, by means of which dust and dirt is kept out from the working parts of the coupling and oil for lubricating is kept in, as the whole is hereinafter described.

D represents a metal sleeve, which is so formed as to oscillate in the case A H, and which is provided with sockets C to receive the balls F on the inner ends of braces E, and provided with a square hole through it to receive the shaft or tumbling-rod G, the other rod, K, fitting into a square hole in that part of the frame shown at A.

Fastening to and projecting in from the inner periphery of the part A are lugs B, which are provided with sockets to receive the balls F' on the opposite ends of the braces E from the balls which fit into sockets C.

Figure 1:
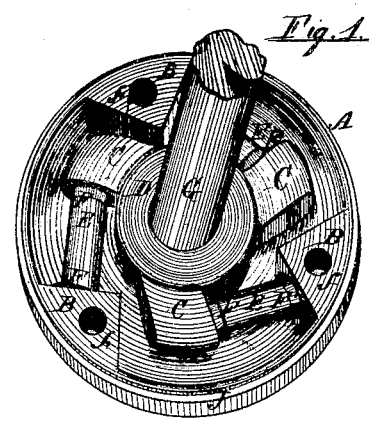
Figure 1 is a perspective representation of my improved coupling with the cap removed to give a clear view of the construction inside.

To put the parts together, it is only necessary to raise the socket D out of its bearing in the part A and then place the outer balls F' in their respective bearings first, after which the inner balls F are placed in the socket C, and the cap H secured by screws put through it and into holes *f*, fig. 1.

It will be seen from this description that the working parts of the coupling are so inclosed as to prevent accidents. But where accidents are not liable to occur, a simple hub to support the shaft K, and arms extending from the hub and supporting the lugs B, will answer the purpose of the shell A. A cap, having radial arms, may be also substituted for the full cap H.

Figure 2:
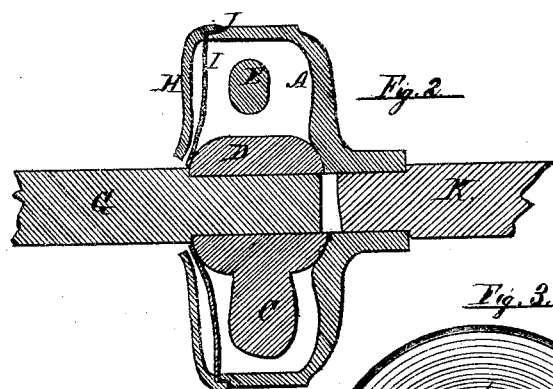
Figure 2 is a longitudinal section of the same with the cap and elastic protector in place.

When the complete shell is used, as shown in fig. 2, and it is desirable to exclude dust and other substances, and also to retain lubricating oil, I place between the parts A H a rubber or other suitable elastic cap, I, which is fitted closely around the shaft G. This arrangement is such that when the shaft G oscillates the rubber cap will yield and yet keep the case oil-tight.

Having thus described my invention,

What I claim, and desire to secure by Letters Patent, is—

1. The oscillating sleeve D, provided with sockets, in combination with the double ball braces and lugs B, provided with sockets, as and for the purpose set forth.

2. The combination of the cap H A, sleeve D, double braces E F F', sockets C, lugs B, provided with sockets, and shafts G K, as described.

3. The combination of rubber cap I, cap H A, sleeve D, double braces E F F', socket C, lugs B, provided with sockets, and shafts G K, as described and shown.

THEODORE ROWELL.

Witnesses:
HARY ROGERS,
T. J. HIBBARD.